No. 859,006. PATENTED JULY 2, 1907.
F. P. NEWLEY.
ATTACHMENT FOR TOOL HANDLES.
APPLICATION FILED APR. 2, 1906.
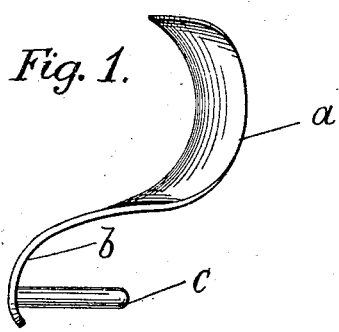
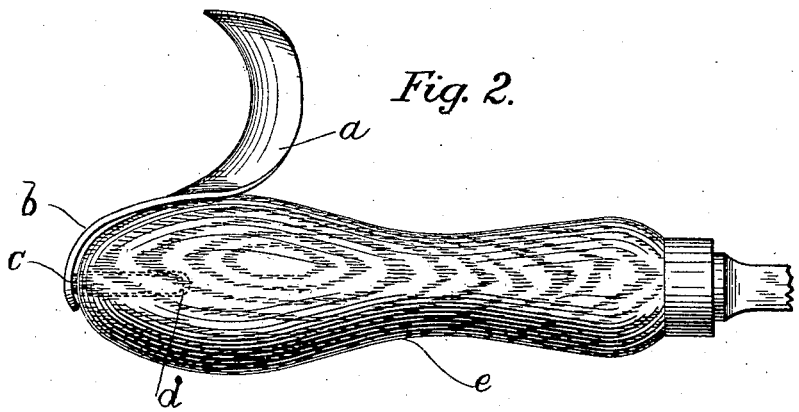
Witnesses.
James G. Stokes.
C. Chiron
Inventor.
Frederich. Percy. Newley.

UNITED STATES PATENT OFFICE.

FREDERICK PERCY NEWLEY, OF LEYTONSTONE, ENGLAND, ASSIGNOR TO CHARLES NURSE AND COMPANY, OF LONDON, ENGLAND.

ATTACHMENT FOR TOOL-HANDLES.

No. 859,006.     Specification of Letters Patent.     Patented July 2, 1907.

Application filed April 2, 1906. Serial No. 309,510.

*To all whom it may concern:*

Be it known that I, FREDERICK PERCY NEWLEY, a subject of the King of Great Britain and Ireland, residing at No. 99 Mayville road, Leytonstone, in the county of Essex, England, have invented a new and useful Attachment for Tool-Handles, of which the following is a specification.

This invention has reference to an improved gripping appliance for the handles of files, rasps, gouges, chisels, screw-drivers, and other similar hand-tools, and it has for its objects to enable the tool handle to be gripped with greater firmness and power, and to provide means whereby the slipping of the hand from the tool handle, from accident or otherwise, will be prevented.

The gripping appliance consists of an abutment piece of steel, brass, or other suitable metal, material, or substance, conveniently shaped, in order that it will fit readily and closely between the thumb and fore finger of the hand of the operator, permitting thereby a firmer grip of the tool and obviating liability of slip.

The appliance may be secured to the handle in a permanent manner, or formed in one therewith; or it may be entirely separate, and readily removable at will.

It will be obvious that gripping appliances for tool handles of the kind above referred to, for increasing the grip and preventing the liability of slip, may be variously constructed without departing from my invention, but I prefer the form shown in the accompanying drawings, in which:

Figure 1 is a side view of a removable type of gripping appliance, and Fig. 2 is a similar view of a tool handle with the appliance fitted thereto.

$a$ is the abutment piece which, when in use is situate between the bases of the thumb and fore finger of the operator's hand. It may be conveniently stamped out of sheet metal, the blank being then shaped, as shown, by any well known means. Its lower or tail portion $b$ is curved and tapered off to conform to the shape of the tool handle, as shown in Fig. 2.

$c$ is the pin or shank which is riveted to the tail portion $b$, or otherwise fastened thereto, or it may be formed in one therewith.

$d$ is a recess in the handle $e$ to receive the pin or shank $c$ which, as shown in the drawings, is free to turn therein, thus permitting the handle to be turned, in order that either side of a tool, such as a file, may be used, while the gripping appliance remains in position in the hand. This removable form of appliance also permits of its use with any number of like tools, the handles of which have been suitably recessed to receive the pin or shank $c$.

Instead of the pin or shank $c$ being round as shown, it may be constructed of a square, triangular, lozenge-shaped, diamond, or other desired cross-sectional form, in which case if the hole or recess in the handle into which the pin is fitted, be of a corresponding form, the handle or gripping appliance will, as regards rotary movement, be fixed, and will move together whenever the former is turned upon its longitudinal axis, as in a screw-driver, in which case the abutment piece $a$ acts as a lever and will aid in the turning movement.

What I claim as of my invention and desire to secure by Letters Patent is:

A gripping appliance for the handles of hand tools, consisting of an abutment piece of suitable metal, or material, curved away from the handle to receive the hand, having a tail piece curved and tapered to the shape of the tool handle, a pin or shank connected to the tail piece, and adapted to take into a corresponding recess formed in the tool handle and capable of removal therefrom, as and for the purposes described.

In witness whereof I have hereunto set my hand in the presence of two witnesses.

FREDERICK PERCY NEWLEY.

Witnesses:
   JAMES G. STOKES,
   C. CHIRON.